Figure 1:
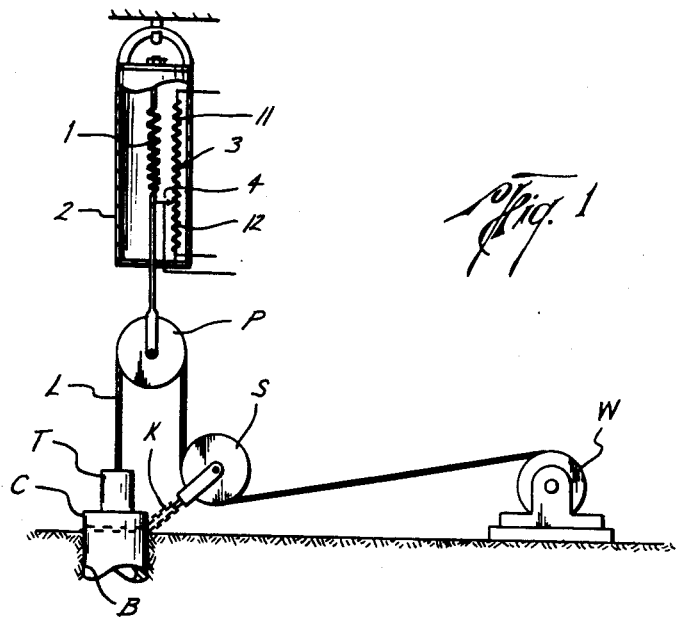

June 14, 1960

C. W. CALHOUN 2,940,308

WEIGHT INDICATING MECHANISM

Filed May 3, 1957

Charles W. Calhoun
INVENTOR.

BY
Charles E. Lightfoot
ATTORNEY

United States Patent Office 2,940,308
Patented June 14, 1960

2,940,308

WEIGHT INDICATING MECHANISM

Charles W. Calhoun, Houston, Tex., assignor to Bowen Itco, Inc., Houston, Tex., a corporation of Texas Filed May 3, 1957, Ser. No. 656,848

1 Claim. (Cl. 73—143)

This invention relates to weight indicating mechanism and to electrical resistance measuring apparatus for use therewith.

While not limited to such use the invention finds particular application in connection with the operation of wells, such as oil and gas wells, wherein wire line or cable mechanism is frequently used for the lowering of various kinds of tools and equipment in such wells and for removing the same therefrom.

In the use of cable or wire line supported equipment in wells difficulty is often encountered due to sticking of such equipment in restricted portions of the well bore or to contact of the equipment with obstructions therein which results in slackening of the line or cable to an extent to cause the formation of kinks therein resulting in the breaking of the cable or line when the load is again applied thereto. At times during the lowering of wire line equipment in a well, the downward movement of the equipment is retarded at a restricted location in the bore while the line continues to be paid out at the same rate so that the line suddenly becomes slack and forms coils or loops in the well. Under these conditions when the equipment has slipped through the restriction and falls downwardly again the line is suddenly tightened which causes the formation of kinks resulting in breakage of the line.

Various means have been proposed heretofore for preventing such damage to well equipment and also for indicating a change in the weight of the equipment and line due to engagement of the equipment with an obstruction or with the bottom of the well, but the means employed for this purpose has not proven satisfactory due to lack of sufficient sensitivity to indicate small changes in the weight of the line and equipment.

The present invention has for an important object the provision of weight indicator mechanism of improved sensitivity by which small changes in the weight of wire line or cable equipment in a well may be quickly indicated.

Another object of the invention is to provide weight indicator mechanism which operates continuously during the use of wire line equipment to indicate an increase or decrease of the weight of such equipment whereby the length of line in the well may be accurately determined.

A further object of the invention is the provision of an electrical resistance measuring circuit of improved sensitivity for use in weight indicator mechanism of the kind referred to and which is also capable of application to many other kinds of equipment.

Another object of the invention is to provide electrical resistivity measuring apparatus of improved sensitivity which may be operated from sources of electrical current of relatively low voltage.

A further object of the invention is the provision of electrical resistance measuring apparatus which comprises a combination of means for measuring electrical resistance throughout a relatively wide range and means for more accurately measuring a small change in resistance within said range.

A more specific object of the invention is to provide electrical resistance measuring apparatus embodying separate resistance measuring circuits and variable resistance means connected into said circuits in a manner to cause a decrease in the resistance of one of the circuits upon the occurrence of an increase in the resistance of the other of the circuits.

Briefly described, the invention comprises variable electrical resistance means which is arranged to vary in response to some change which is to be measured, such as a change in the force exerted on a wire line, and separate resistance responsive means for indicating an increase in one portion of said resistance means and for indicating a corresponding decrease in another portion of the resistance means upon the occurrence of a variation in the resistance means. The invention also embodies electrical resistance measuring apparatus, which may also be used for various other electrical measuring purposes, and which includes electrical circuits, each having a source of electrical current, means for connecting the circuits in a manner such that there will be a tendency for current to flow in one direction in one circuit and in the other direction in the other circuit, and means for measuring the difference between the currents flowing in the circuits.

The above and other important objects and advantages of the invention may best be understood from the following detailed description constituting a specification of the same when considered in conjunction with the annexed drawings, wherein Figure 1 is an elevational view illustrating somewhat schematically the application of the invention in connection with the measurement of the weight of well equipment.

Figure 2:
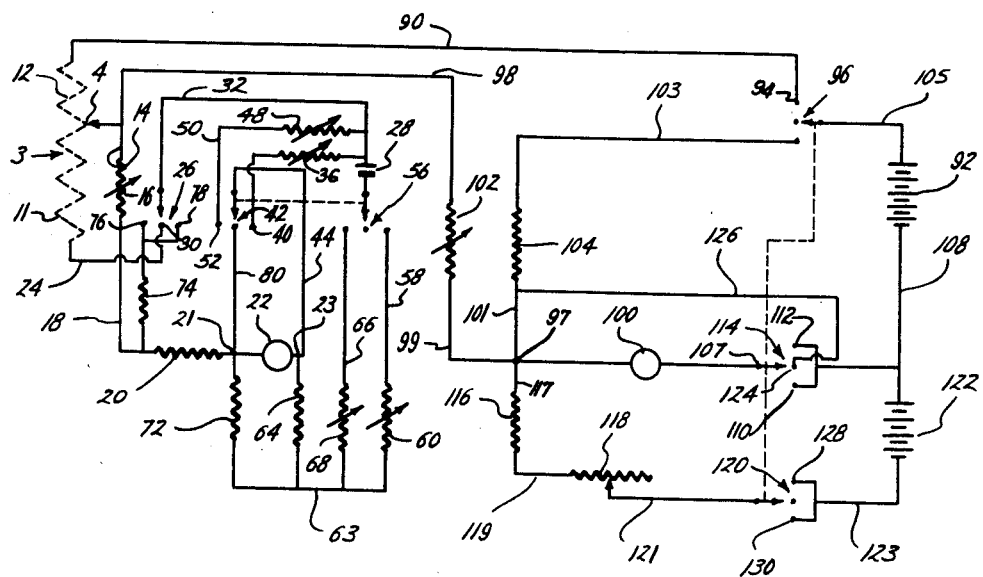

Figure 2 is a circuit diagram illustrating a preferred form of the electrical system of the invention.

The invention is illustrated herein, by way of example, in connection with the application to the measurement of the weight of a wire line or cable and well equipment in a well. In the use of such equipment in a well it is desirable to know the force which is being applied to the line or cable at all times during the operation of the equipment, and also to be able to quickly detect changes in such force. The occurrence of a sudden relatively small change in the force applied to the line is often indicative of the encountering of a restriction or other obstruction in the well bore likely to cause breaking of the line, and one of the chief advantages of the invention lies in the provision of means whereby such changes may be quickly detected, so that stretching or kinking of the line may be avoided.

Referring now to the drawings in greater detail the invention is illustrated in Figure 1 in its application to equipment which is operated in a well, indicated at B, which may have the usual well casing C within which a well tool or other device of conventional type, indicated at T, is to be operated. The tool T is connected to a wire line or cable L, to be lowered into the well.

In the present illustration the cable L passes upwardly and over a sheave P, and then downwardly and about a sheave S which is suitably anchored to the casing C or other structure, as by means of a chain K. The cable is connected to suitable winding mechanism, such as that indicated at W, which is suitably anchored and which may be operated to wind up and pay out the cable.

The suspension means for the cable L also includes spring means, such as that shown at 1 which is connected at one end to the upper sheave P and by which the sheave is connected to a supporting structure, such as a derrick, the spring means being enclosed in a suitable housing, such as that shown at 2, within which a variable resistance element 3 is insulatingly supported. The resistance element 3 is provided with a slidable contact 4 connected to the spring means in a manner to move along the resistance element to vary the resistance in accordance with the weight which is applied to the spring means.

The electrical circuits of the electrical resistance measuring apparatus of the invention are illustrated diagrammatically in Figure 2 wherein the variable resistance element associated with the cable suspension mechanism is indicated at 3, having the movable contact 4 whose position on the resistance element is determined by the force which is applied to the cable L.

The electrical circuits of the resistance measuring apparatus take the form of two separately operable components, one of which is of the Wheatstone bridge type while the other is a current balancing circuit of greatly improved sensitivity by which small changes in resistance can be indicated.

The first resistance measuring circuit includes the portion 11 of the resistance element 3 located below the contact 4, which portion is connected into one arm of the Wheatstone bridge circuit. The movable contact 4 is connected through a variable resistor 16 and a fixed resistor 20 to one terminal 21 of a current sensitive instrument 22 such as a microammeter. The variable resistance element 3 is also connected at one end to a suitable source of electrical current such as the battery 28 through a conductor 24, a contact 30 of a three position switch 26 and a conductor 32, the battery 28 being also connected to the fixed resistors 64 and 72 through a selected one of two variable resistors 60 and 68 under the control of a switch 56. The fixed resistor 64 is connected to the terminal 23 of the current sensitive instrument 22, while the resistor 72 is connected to the other terminal 21 of the current sensitive instrument 22, whereby the fixed resistors represent equal resistance arms or branches of the Wheatstone bridge.

The fourth arm or branch of the Wheatstone bridge is made up of the variable resistors 36 and 48 either of which may be placed in circuit with the battery 28 and current sensitive instrument 22 through a switch 42 and a conductor 80 which leads to terminal 21.

A resistor 74 is connected at one end to contacts 76 and 78 of the switch 26 and at its other end is connected to the resistors 16 and 20, the resistor 74 being for the purpose of calibrating the bridge so that the current sensitive instrument 22 indicates maximum current flow or full scale deflection when there is no load on the cable or when there is a predetermined initial load thereon. The bridge may also be adjusted by the use of the variable resistor 16 so that there will be a predetermined amount of unbalance with a predetermined initial load on the cable, which unbalance will be shown on the instrument 22, at the beginning of the operation of lowering the cable suspended equipment in a well bore.

The resistors 48 and 36, in the fourth arm or branch of the Wheatstone bridge, are each adjustable to cause a balanced condition of the bridge corresponding to two different predetermined amounts of weight to be measured. For example, the resistor 48 may be adjusted so that a balanced condition of the bridge will result when a load of 10,000 pounds is applied through the cable, while the resistor 36 may be adjusted so that a balanced condition will result when a load of 20,000 pounds is applied.

Variable resistors 60 and 68 are provided for the purpose of compensating for diminishing voltage of the battery 28, these resistors being adjustable to reduce the resistance of the battery circuit so that the voltage in the battery circuit can be maintained constant. The resistors 60 and 68 are adjusted by moving switch 26 to close contact 76 or contact 78 which puts the resistor 74 in circuit with resistor 48 or resistor 36 in one arm or branch of the bridge, so that whichever of the resistors 48 and 36 is selected, it may be adjusted to give the predetermined indication desired on the instrument 22. By the provision of the two voltage compensating resistors 68 and 60, one of these resistors will be in circuit with the resistor 48 when the resistor 48 is being used, while the other compensating resistor will be in circuit with resistor 36 when the latter is in use, so that no voltage compensating adjustment will be necessary when the switches 42 and 56 are operated together to change from one load range to another.

When the Wheatstone bridge is not in use, the terminals 21 and 23 of the current sensitive instrument 22 may be connected together through conductor 80, switch 42 and conductor 44, to protect the instrument against damage due to jarring while being transported.

In the operation of the Wheatstone bridge, as the load of the cable and equipment increaess during the lowering of the equipment in the well the portion 11 of the resistance element 3 located above the contact 4 in Figure 1 will become longer, thus increasing the resistance in the first or operating arm of the Wheatstone Bridge, and as the resistance becomes greater and greater the variable resistor 48 or 36, depending upon which one is in circuit may be adjusted to maintain the bridge in balance. In Figure 2 which is diagrammatic, the portion 11 of resistor 3 is shown below contact 4 instead of above the same for purposes of convenience. The resistors 48 and 36 are, of course, suitably calibrated to indicate the load on the cable. The switches 42 and 56 are connected together for simultaneous operation, so that when resistor 48 is in circuit, resistor 68 will also be in circuit, and similarly when resistor 36 is in circuit, resistor 60 will also be in circuit, thus facilitating the changing over from one range of the apparatus to another. With the apparatus operating in this manner, the load on the cable is continuously indicated as the equipment is raised and lowered, whereby the amount of cable which is paid out or taken up can be accurately determined and it can also be quickly determined when the equipment reaches bottom or encounters an obstruction or restriction in the well.

For the purpose of more accurately measuring the weight which is applied to the cable during the raising or lowering of the equipment, whereby the encountering of an obstruction or restriction in the well may be more quickly indicated, so that sudden slacking off of the cable may be avoided and the application of excessive strain on the cable may also be prevented, a more sensitive resistance measuring means is provided in accordance with the invention.

This improved resistance measuring arrangement, which is of much greater sensitivity than can be obtained by the use of the Wheatstone bridge method of resistance measurement, embodies a separate circuit which is isolated from the circuits of the Wheatstone bridge, but which makes use of the weight variable resistance for its operation.

The improved resistance measuring arrangement includes the portion of the resistance element 3 which is located above the sliding contact 4, as seen in Fig. 2, which contact is connected to one terminal 97 of a current sensitive instrument 100, such as a microammeter, through a conductor 98, a variable resistor 102 and a conductor 99.

The current sensitive instrument 100 is connected into two current supply circuits in such a manner that the supply of current in each of these circuits which tends to flow through the instrument may be balanced so that the instrument indicates no flow of current in the balanced condition of the circuits.

One of the current balancing circuits comprises a resistor 104 which is connected at one end to the terminal 97 of the instrument 100 through a conductor 101, and at the other end to a current supply source, such as the battery 92, through a conductor 103, a switch 96 and a conductor 105. The battery 92 is also connected to the other terminal 107 of the instrument 100 through a conductor 108 and a switch 114. The other one of the current balancing circuits comprises a resistor 116 connected at one end to the terminal 97 of instrument 100 by a conductor 117 and whose other end is connected to a separate current source, such as the battery 122, through a conductor 119, a variable resistor 118, a conductor 121, switch 120 and a conductor 123. The battery 122 is also connected to the terminal 107 of instrument 100 through conductor 108 and switch 114.

The switch 96 has a contact 94 connected to a conductor 90 which leads to the upper end of the resistance element 3 and which may be closed to connect the upper portion 12 of the resistance element 3 in circuit with the battery 92 and instrument 100 through resistor 102 or opened to disconnect the resistance 12 from such circuit. By moving the switch 96 to close contact 94, the resistance portion 12 is placed in circuit and by moving the switch 96 to another position the resistance portion 12 is taken out of circuit and the resistance 104 is connected in circuit.

From an examination of the current balancing circuits, as illustrated in Figure 2 it will be apparent that current will tend to flow through one circuit through the instrument 100 in a direction opposite to the direction of the tendency of current to flow in the other circuit through the instrument. By providing current supply sources of suitable voltage, such as a battery of 6.7 volts for the source 92 and a battery of 1.34 volts for the source 122, and using resistors of suitable value, such as 5100 ohms for the resistor 104, 940 ohms for the resistor 116 and 50 ohms for resistor 118, the current flow in the two circuits through the instrument 100 may be adjusted to balance out so that no current will be indicated when the circuits are in balanced condition.

With the circuits in balanced condition the switch 96 may be moved to close contact 94 to put the portion 12 of resistance element 3 in circuit while taking resistor 104 out of circuit, whereupon resistor 102 may be adjusted to again balance the current flow through instrument 100.

During downward movement of the cable and equipment in the well, it will be seen that the portion 12 of resistance element 3 will be decreased in accordance with the increase in the weight applied to the cable, so that by suitably calibrating the resistor 102 the adjustment of this resistor necessary to rebalance the current flow through instrument 100 will indicate the load on the cable. Due to the greatly increased sensitivity of the current balancing circuit arrangement of the invention the change in the weight applied to the cable may be more accurately measured, and sudden changes in the applied force more quickly indicated, so that the encountering of obstructions or restrictions in the well by the equipment may be prevented from causing slacking off of the cable or the application of excessive strain on the cable.

The terminals of the current sensitive instrument 100 may be connected through a conductor 126 which is conected to a contact 124 of the switch 114 so that the instrument is short circuited by moving the switch to a position to close the contact 124 when the instrument is not in use, to prevent damage to the instrument by jarring in transportation. The switches 96, 114 and 120 are arranged as a gang to be moved simultaneously to one position to connect the resistance portion 12 and resistance 102 into the current balancing circuit and to another position to disconnect resistance portion 12 and resistance 102 and to connect the resistance 104 in circuit. In the intermediate portion of the switches the instrument 100 will be short circuited as described above.

The invention provides weight indicating mechanism which is simple in construction and arrangement and which is accurate in use.

While the invention is disclosed herein in connection with a specific embodiment of the same, it will be understood that this is intended by way of illustration only and that various changes can be made in the arrangement of the parts as well as in the circuits employed without departing from the spirit of the invention or the scope of the appended claim.

Having thus clearly shown and described the invention, what is claimed as new and desired to secure by Letters Patent is:

In weight indicating mechanism an electrical resistance element, electrical contact means movable in contact with the element, a first electrical circuit into which said contact means and a portion of said element are connected, means for moving the contact means to vary the resistance of said first circuit in proportion to the weight of a load whose weight is to be indicated, a source of electrical current for said first circuit, means for measuring the resistance of said first electrical circuit, a second electrical circuit, separate sources of electrical current connected in series in said second circuit, a branch circuit for each of said sources, means connecting the branch circuits and through which current in the branch circuits may flow in opposite directions, means for indicating a difference in the current in the branch circuits, means for connecting said movable contact, and the remaining portion of said resistance element into one of said branch circuits and means for varying the resistance of the other of said branch circuits to equalize the tendency of the current to flow through the branch circuits.

References Cited in the file of this patent
UNITED STATES PATENTS

| | | |
|---|---|---|
| 1,882,932 | Rosen | Oct. 18, 1932 |
| 2,240,184 | Hathaway | Apr. 29, 1941 |
| 2,353,249 | Lebourg | July 11, 1944 |
| 2,421,222 | Schaevitz | May 27, 1947 |
| 2,478,720 | Sourwine et al. | Aug. 9, 1949 |